3,416,664
ARTIFICIAL KIDNEY
Herman L. Kumme, 2312 Walnut Lane, Arden, Del., and John F. Lontz, 515 Eskridge Drive, Wilmington, Del. 19809
Filed Nov. 16, 1964, Ser. No. 411,206
2 Claims. (Cl. 210—87)

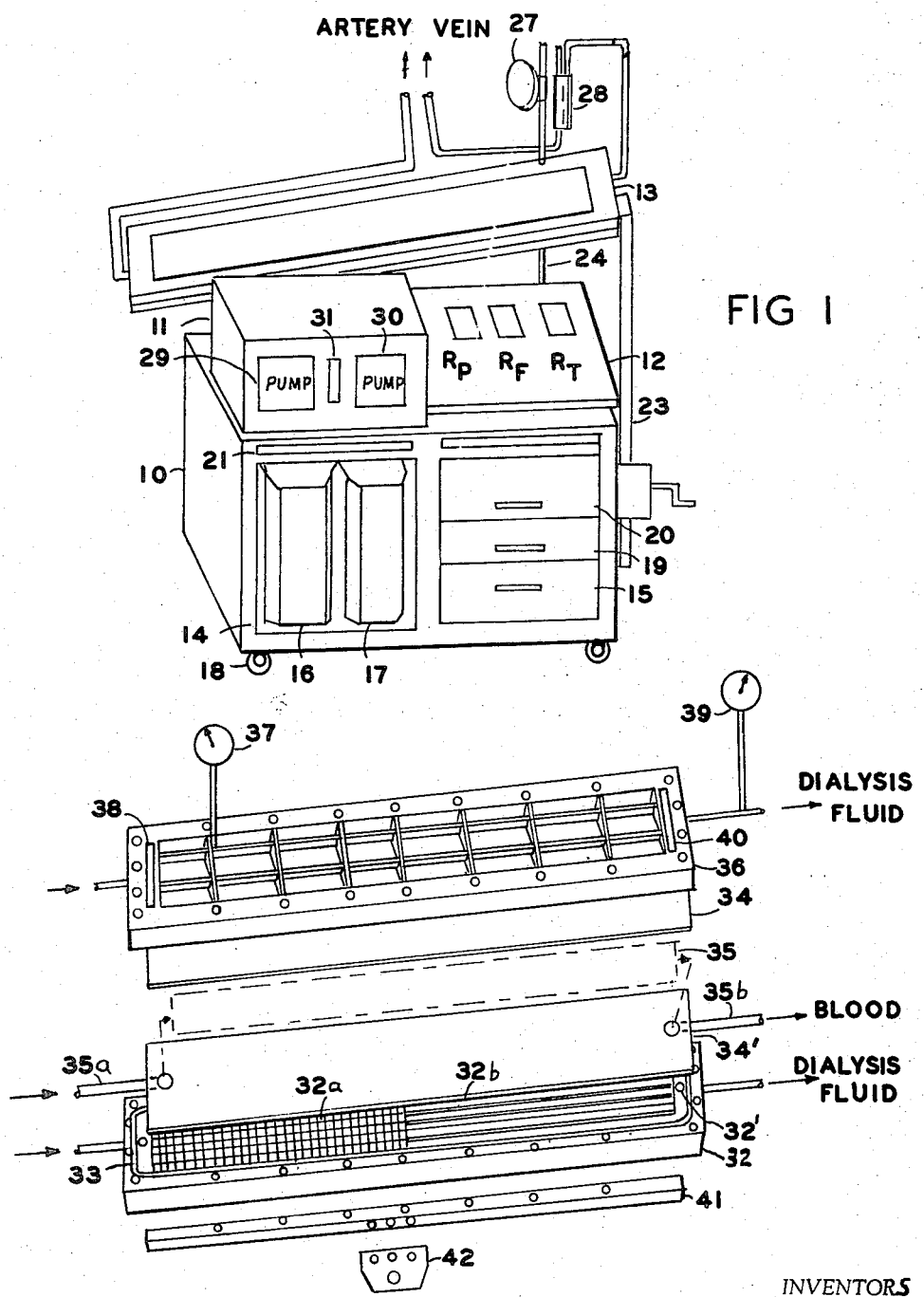

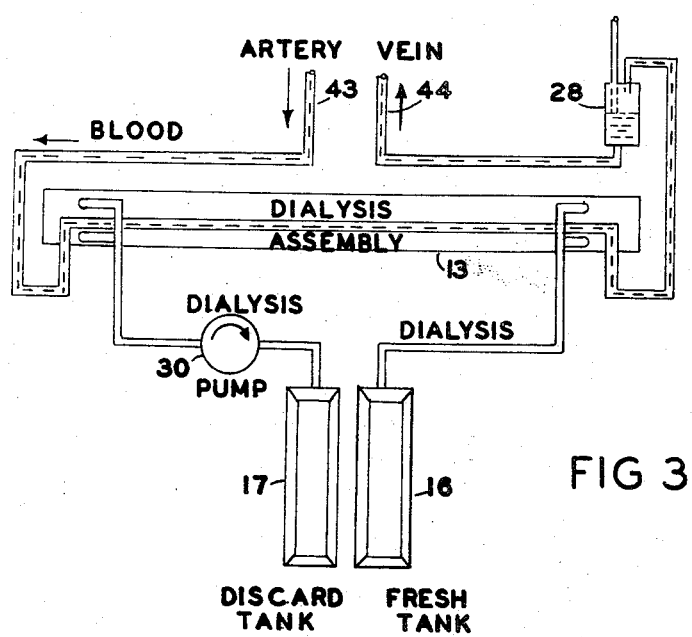
FIG 3
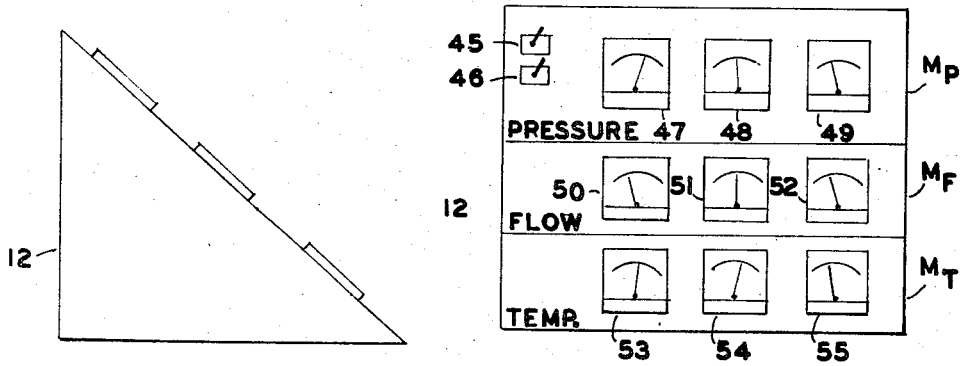
FIG 4A
FIG 4

ABSTRACT OF THE DISCLOSURE

An integrated dialyzing system controlling pressure, temperature and flow of blood flowing in the system. The blood is passed between semi-permeable membranes and the dialyzing solution is passed on the outside of the membranes. The dialyzing solution is passed through in the system only once and then discarded. This permits optimum control of the purity and composition of the dialyzing solution. The system is flexible and the temperature, pressure, and flow can be read and controlled or not controlled independently as desired. These controls may be manual or automatic as desired.

---

This invention pertains to an improved method of extra-corporeal hemodialysis when used in what is more commonly known as the artificial kidney and more particularly to a completely integrated system with controlling and regulating components. The present application is related to our copending application Ser. No. 411,407 filed Nov. 16, 1964, now abandoned, which shows construction details.

This invention provides a means for conducting dialysis of blood outside of the physiological environment by passing it between semipermeable membrane under controlled conditions with novel combination of devices that enable one to regulate the flow of blood for safe, efficient treatment of patients and for studies with animals for the purpose of removing toxic substances. This in principle is what the artificial kidney is used for and is well known in clinical practice. In actual practice the blood is made to flow in between semipermeable membranes to allow the passage of toxic substances, accumulated in the blood either because of kidney failure or other pathological conditions, through the membranes into a circulating dialysis solution. In effect, the dialysis solution is made to come into contact with a semipermeable membrane on the other side of which the blood is flowing. In this blood-membrane-dialysis solution arrangement, which still maintains a fluid continuum, all solutes, whether they are electrolytes, such as salts, acids, and bases, or nonelectrolytes, such as urea, amino acids, often sugar and other organic substances referred to as crystalloids, will tend to readjust their concentrations by migrating or moving across the membrane to attain ultimately an equilibrium or constant concentration. The time that it takes to reach this equilibrium is dependent upon many factors. More pertinently, the rate at which a given solute moves across the membrane depends upon the difference in the concentration or, as is more commonly referred to, the concentration gradient. Toxic factors in blood notably urea, creatinine, uric acid and other deleterious metabolic products move through the semipermeable membrane into the dialysis fluid which is purposely set to zero concentration initially in our system while the desirable or essential electrolyes and nonelectrolytes or crystalloids are deliberately added to the dialysis fluid so as not to put these out of balance with the required serum level. The semipermeable membrane does not allow the passage of high molecular weight entities and the suspended cells and other constituents of blood. In actual practice, the dialysis operation requires a close control over the content of the dialysis solution; also, the rate of removal of toxic substances must be controlled so as not to induce any undesirable effects as the blood moves from its normal physiological confines to the extracorporeal environment.

Numerous arrangements for extracorporeal hemodialysis have been devised and described in the literature. These are based on use of membranes arranged in coiled, tubular, or flat plate devices using cellophane as the principal dialyzing membrane. Each of these types has certain advantages but also certain disadvantages. Some require coiled tubing supported by means of Fiberglas or plastic interspacers which are used once and disposed but at considerable expense. Others require 30 to 70 precut pieces of tubular film stacked with considerable and tedious assembling using various inlet and gasketting devices that are difficult to align properly and often lead to leakage. Moreover, the assembled dialyzers require constant attention for signs of blockage or restricted flow and the like, and do not provide for regulating and recording the actual dialysis in closer coordination with some of the significant transient effects on the patient. In this invention we have made provisions for integrating and coordinating the hemodynamic effects so that they can be controlled and used to readjust or pre-empt some of the effects that could prove deleterious to normal heart action with disasterous results. This has been effected through the use of a novel dialysis plate assembly described in our co-pending patent application and by providing a monitoring system that can regulate in various ways the course of the dialysis.

It is therefore the object of this invention to provide a complete hemodialyzer or artificial kidney that can be connected to blood circulation system whose principal characteristics of pressure, pulse, flow and temperature can be integrated to a safe, reliable and easily controlled arrangement. Another object is to provide a dialyzing system for removing toxic or unusual serum components using only the physiological, circulatory blood flow or pressure, often referred to as a pumpless system, which is continuously monitored and hence regulatable by intermittent or continuous adjustments whenever needed to avoid abnormal or fatal circulatory, pulmonary and other physiological conditions. Another object is to provide a system of continuous dialysis in which the dialysis solution is used once-through in passing through the dialyzer and discarded so as to maintain maximum possible concentration gradient. Still another object is to provide a pumpless dialysis system utilizing low cost membranes, capable of rapid assembly and disassembly and ready adjustment by attending personnel with only minimal of skill. Other objectives and advantages will be apparent with the description of the various components discussed in the ensuing details.

This invention pertains to an improved dialysis system connected to a by-pass of circulating blood and provided with monitoring facilities for pressure, pulse, flow, and temperature employed singly or in various combinations and for the regulation of the flow, vacuum, and temperature of the dialyzing fluid. This invention also pertains to the use of the physiological or autogenous, i.e., self-generating, vascular pressure as the principal means for propelling the blood in between a parallel assemblage of semipermeable membrane in a manner such that any fall in pressure can be evident and hence readjustable either manually or automatically with constrictive or shut-off action. Similarly, any decrease or stoppage of the flow of the blood through the dialyzer is made evident for pertinent correction or adjustment either in the physiological source or in the flow lines or membrane component. A unique feature of this invention is the adaptation of the arterial pressure and flow in a manner that relieves tiring attention on the part of attending nurse, physician or technician and more particularly decreases or eliminates the annoyance to the patient of the monotonous sphygmomanotric determination of the pressure and pulse, which often can be painful to patients or animals afflicted with phlebitic arteries. This invention provides a complete, integrated system of hemodialysis of inestimable value in extracorporeal hemodialysis with pre-determined cut-off limits or directions when afflicted patients are put on the machine; such limits would include, for instance, signals for stopping or reducing the shunted blood flow or pressure so that the attendant would check for source of epoxide and take corrective action.

FIGURE 1 is a projected view of the complete integrated hemodialysis system.

FIGURE 2 is a disassembled view of the dialysis plate with the structural components.

FIGURE 3 is a diagrammatic sketch of the dialysis system illustrating the flow lines for the blood and the dialysis solutions for the once-through process.

FIGURE 4 is a diagrammatic sketch of the monitoring panel for pressure, flow, and temperatures.

FIGURE 4A is a side view of FIGURE 4.

Figure 5:
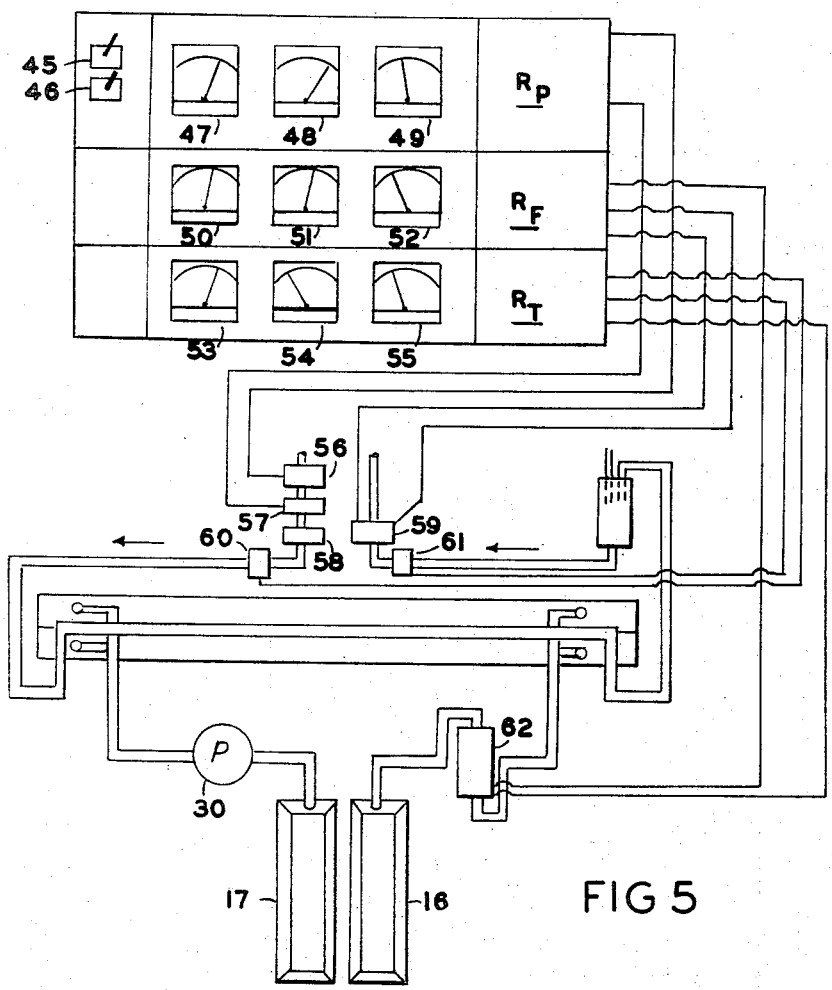
FIGURE 5 is a diagrammatic sketch of the monitoring panel with ancillary regulating or control lines.

Referring to FIGURE 1, it will be seen that the hemodialysis system of this invention is an integrated apparatus consisting of a portable or movable cart 10 to which are affixed a pump case 11, control box 12, and the dialysis plate assembly 13, along with necessary tubing for the flow and regulation of the blood and of the dialysis fluid as further elaborated in ensuing details. In FIGURE 1 cart 10, constructed of conventional materials but primarily of aluminum and structural plastics for lightness, is provided with two separate compartments 14 and 15 designated as left and right, respectively, and mounted on casters 18, preferably of conductive variety. Compartment 14 is designed to accommodate two containers 16 and 17, preferably 5-gallon or 20-liter jerry cans made of plastic material usually polyethylene; the manner in which these containers are used in this system of hemodialysis is one of the unique aspects of this invention, namely, once-through flow through the dialysis plate 13. Container 16 (or 17) is filled initially with a fresh stock of the dialysis solution made according to operating details described later on, while the other container 17 (or 16), initially empty, takes up the discard or spent solution returned from the dialyzing plate assembly 13; in this manner the dialysis of the blood takes place always with a fresh stock and hence provides maximum concentration difference or as is technically referred to as concentration gradient between the blood and the dialysis fluid as they enter the dialyzing plate assembly 13 either in counter-current, parallel, or cross-dialysis flow. Compartment 15 provides space for storage of incidental items and has two movable drawers 19 and 20 for special storage of instruments, hemostats, tubing, and so on. A movable shelf 21 is provided for temporary storage of dialysis reagents, sterilizing solutions and other sundry items and situated over each of the compartments 14 and 15. The cart is preferably provided with a lever crank connected to a rising post to which the dialysis plate 13 is attached for raising or lowering during the dialysis operation. On the cart are preferably mounted two short support columns for easy dismantling for the pump case 11 and control box 12 and to isolate any chance spillage that might get into the electrical devices in the case and in the box and thus cause electrical shorts. A fixture post 24 is attached for holding a vacuum gauge 27 and a debubbler 28 used in the return blood line.

Pump case 11 contains two different pumping systems. Pump A indicated by number 29 in FIGURE 1 is used in the blood circuit for (a) circulating a sterilizing solution, (b) flushing out the latter with saline solution prior to hemodialysis, (c) priming with appropriate intravenous (IV) fluids or whole blood, and (d) returning the last portions of the circulating blood at the termination of the hemodialysis. Any conventional pump suited for extracorporeal dialysis can be used, such as the peristaltic or roller types; such a pump should have a ready disconnection, just prior to actual dialysis, as the system of this invention is designed for pumpless blood flow depending primarily on arterial pressure. The second, pump B indicated by number 30 in FIGURE 1, is designed as a pulsatile, diaphragm pump capable of inducing up to 700 millimeter mercury gauge vacuum in drawing the fresh dialysis fluid from the container 16, through dialysis plate 13, then through pump B through flow meter 31 and finally discarded into container 17. In the present system an adjustable ⅛ to ½-inch stroke, reciprocating diaphragm pump with neoprene, "Viton" or similar, chemically resistant materials is used. Pump A is designed to provide a flow from 0 to 800 cubic centimeters per minute, while pump B provides from 0 to 1600 cubic centimeters per minute.

Control box 12 contains the necessary electrical switches to actuate pumps A and B and optionally pressure indicators are $R_P$ and $R_F$ and $R_T$ for systolic and diastolic blood pressure, pulse rate, blood flow rates for monitoring the blood as it enters and leaves the dialysis plate, along with indicated temperatures, and by-pass measurements of selected blood characteristics such as hematocrit, viscosity, potassium, uric acid, etc., in whatever combinations or selections that meet minimal reqiurements during dialysis, as shown in FIGURE 5.

The dialysis plate assembly 13, which is described in more functional detail in our co-pending application and is shown in a distended view in FIGURE 2, comprises the following components listed in the order of arrangement from the bottom to top:

(a) bottom plate complex 32 with rigid outer frame, and a hollow, rib-gridded interior, with either a pyramidal pattern (32a) or parallel grooved pattern (32b) depending upon specific dialyzing conditions where rippling is desired with the former or minimum rippling with the latter for reasons described in detail in the co-pending application, and provided with a precision groove for an O-ring seal 33, fixed in the groove in a precise pattern to eliminate or minimize stagnation of the blood by a fanning pattern, and inlet-outlet holes 32';

(b) interstitial layer 32a and 32b through which the dialysis is made to flow parallel or countercurrent to the blood flow, under the pulsatile action of pump B and separated from the blood layer by;

(c) semipermeable, dialyzing membrane 34' usually made from regular or treated cellophane such as PD215 (E. I du Pont de Nemours and Co., Inc.), PD190 American Viscose Corp.), or "Cupraphan" (Bemberg);

(d) interstitional blood compartment 35 formed by the membranes of 34 and 34' wherein the blood is made to flow from inlet 35a into an expanded, filmed-out layer to a cross-sectional thickness from three to thirty thousandths of an inch to the outlet 35b, at a high surface to volume ratio indicated in one co-pending application providing surface area of at least 20 square centimeters per cubic centimeter of blood;

(e) semipermeable dialyzing membrane 34 same as (c) above or an appropriate modification;

(f) interstitional layer same as (b) above for the passage of the dialyzing fluid; and (g) top plate 36 shown with the cover removed similar to the bottom plate 32 with respect to the contacting pattern of either rippling, pyramidal pattern or parallel-grooved pattern supported by a rigid outer frame and a hollow but rib-gridded interior.

Except for the membrane, the basic material of construction is the transparent polymethyl methacrylate resin for the rigid exterior, plate pattern, ribbing and cover plates over the ribbing; manifold inlets and outlets for the dialysis fluid are also made from the same resin. The top plate does not require an O-ring sealing as this is affected, as described in the copending application, by the critical and precise array of the plate components. Attached to the top plate is a vacuum gauge 37 tapped through one of the rib structures to the plate pattern a few inches away from the dialysis fluid inlet manifold 38; optionally another vacuum gauge 39 is inserted just away from the dialysis outlet manifold 40 to insure that requisite vacuum exists throughout the interstitial dialysis compartment. The bottom plate 32 is attached to a metal supporting runner 41 and to a retainer plate 42 for attaching to a yoke than can be raised or lowered for the operation.

FIGURE 3 provides a diagram of the flow lines for the blood and dialyzing solution. The blood line moves from the radial artery inlet 43 to the dialysis assembly 13, as shown in FIGURES 1 and 2, in between the two layers of cellophane and out to the debubbler 28 and finally back to the vein 44. Meanwhile, the fresh dialysis solution under action of the pump 30 is drawn through the interstitial compartment between the cellophane membrane and the plate, countercurrent to the flow of the blood as shown in FIGURE 3 or alternatively parallel to the blood flow under certain other conditions, and through pump B and ultimately to the discard tank 17, which is analyzed periodically during the dialysis for the toxic dialysates such as urea, creatinine, uric acid, various nitrogenous products as well as other toxic materials ingested accidentally or through deteriorating, diseased metabolism.

FIGURES 4 and 4A illustrate diagrammatically one simple arrangement for monitoring the principal hemodynamic variables, the elaboration of which depends upon whether the system is used for strictly clinical purposes in a routine dialysis or for more sophisticated uses especially in research with animals or as a training or teaching aid. The illustrated arrangement consists of three principal modules ($M_P$, $M_F$, $M_T$) for (a) pressure, (b) flow rates, and (c) temperature. Thus, next to the actuating toggle switches for blood line pumping 45 and dialysis pumping 46 are located indicator dials of the conventional type that read systolic pressure 47, diastolic pressure 48 and pulse rate 49 composited from numerous commercial devices. For these pressure indicating devices the necessary electronic circuitry including stand-by calibration devices are placed in the lower right compartment 15 and made integral with the dialysis system. Next is the module for indicating various flow rates, namely for arterial or inlet flow 50, venal or outlet flow 51, and dialysis flow 52 from the fresh stock container 16. Additionally is a third module for measuring temperatures of the arterial inlet blood 53, venal outlet blood 54 and the fresh dialysis 55, the last being important for additional heating devices depending upon desired temperature for the dialysis operation. These three monitoring modules can be further modified with regulating modules ($R_P$, $R_F$, $R_T$) installed adjacent to the control box as shown in FIGURE 5. These auxiliary modules provide the usual sensing and commanding systems. For instance, in the case of the indicated arterial blood pressure sensed by a pressure probe 56, the regulating module $R_P$ is preferably provided with upper and lower stop circuits responsive to probe 56 that actuate the mechanical construction or close-off clamp 57. This part of the system has proven particularly useful in applying the dialysis operation of this invention to instances where the physiological conditions are highly prone to hemorrhage shock especially with dogs and with patients having low blood pressure. In particular the pressure monitoring module relieves the attending nurse or physician of the need for constant manual measuring of the blood pressure with the sphygmomanometer repeatedly every minute for the first hour of the dialysis. Conventional pressure probes made by various manufacturers have been successfully applied for this critical monitoring. The next regulating module $R_F$ employs indicators and means 58 for measuring blood flow at the arterial inlet end and the venal return end 59, used either for straightforward indication or for command to regulate the constrictor clamp 57. Similarly, temperature probes for the arterial inlet end 60, venal return end 61 and the dialysis flow 62 can regulate to predetermined rates by a feedback mechanism that will drive the dialysis pump 30. In all of these modules, the usual commercially available circuitry and ancillary limiting devices can be readily and conveniently adapted to the display face of the control box 12. Not all need be installed initially but rather built up gradually as needs for elaborate details develop.

The dialysis plate shown in FIGURE 2 is readied with the double layer of a semipermeable membrane, pre-cut to size, and the tubing for the blood and dialysis lines are connected as shown in FIGURE 3. Prior to connection to the patient, who has been prepared surgically with an artery-vein shunt, such as described in the Transactions of the Society for Artificial Internal Organs, Volumes VI to X, the dialysis plate is primed with either whole blood or an appropriate intravenous (IV) solution, such as normal saline, 5 percent glucose, Ringer's lactate, and the like. When the extracorporeal circuit of patient-to-dialyzer-to-patient is complete, the arterial pressure is monitored at the probe 56 and telemetered visually by the indicators 47, 48 and 49. On instruction from attending physician, the low limit of the systolic pressure that would lead to shock is watched for so that in case this in approached, the attendant can apply a constriction at 56 manually and hold until the systolic pressure rises again to the safe region; alternatively, the constriction at 56 can be applied through the servo-mechanism installed in module $M_P$ with its regulating module $R_P$ with preset limits for closure at the preset pressure and released as the pressure approaches that also preset as the safe operating pressure, avoiding the near shock level which frequently is below 70 millimeters mercury systolic. At the end of the dialysis, the arterial inlet is disconnected from the patient at the cannulation region and promptly covered with a sterile gauze as a protective filter; the inlet tubing is then attached to pump A which is actuated to pump out the blood trapped in the plate in the debubbler and returned to the patient. In this case, only the air entering through the gauze serves to propel the blood, but alternatively the disconnected inlet tube can be placed in a sterile saline or other appropriate intravenous fluid which then propels, under the action of the pump, the blood back into the patient. With either method the loss of the blood due to hold-up in the plate and ancillary components can be kept down to as low as 25 milliliters, and usually averages about 40 milliliters.

The dialysis conducted with the plate assembly and regulating devices, used in optional variations, can be applied to various clinical applications including combinations of (a) removing toxic substances, (b) readjusting electrolyte balance such as the essential mono- and divalent serum ions and especially potassium, and (c) removing water in cases of edema or congestive heart conditions. It is often desirable to adjust one in preference to the other depending upon the most expedient treatment needed. Thus, frequently with excessive uremic toxicants or potassium, the dialysis is programmed to remove these at some specified blood dilution, say at a given hematocrit level, where often an IV fluid is added, usualy at the start of the dialysis. Following this procedure, ultrafiltration or removal of water from the circulating blood is programmed until the desired hematocrit is attained. In some instances, the reverse is directed with emphasis on early and prompt removal of water, then followed by removal of toxicants or readjustment of the essential serum electrolytes. These illustrate the significance of a regulating system to assume prompt and safe treatment in critical stages and to emphasize the value of such a system devised in this invention.

From the foregoing description and accompanying figures, it will be apparent that this invention provides an integrated system of dialysis which depends upon numerous factors involving not only the extraneous toxicants that have to be removed, but also the readjustment of the electrolytes. These factors in turn depend upon physiological conditions including the hemodynamics of the entire vascular or blood system as it is circuited through the dialyzer. Thus, while the dialyzer is intended to provide several functions listed above, these must be controlled and whenever necessary halted temporarily as dangerous and fatal conditions, for instance hemorrhagic shock, are approached. The extracorporeal system is highly dependent upon the physiological condition and should therefore augment it by providing the least interference without any undue or uncalled for unbalance of arterial flow or disruption of the integrated hemodynamic blood circuitry that may impose abnormal effects on the heart.

What is claimed is:

1. An extracorporeal hemodialysis device comprising, in combination, a pair of semi-permeable membranes, means for introducing a flowing blood stream under pumpless hemodynamic conditions between said semipermeable membranes, means to pass a dialyzing solution of isotonic electrolyte composition of normal serum in countercurrent direction to the flow of the blood stream, said solution being permitted to flow in one single pass from which it is discarded, said blood being disposed in a surface to volume ratio of at least 20 square centimeters per cubic centimeter of blood displaced between a parallel array of said confining pair of semipermeable membranes, said membranes being in turn confined by upper and lower, flowing layers of said dialyzing solution, two structurally rigid yet flexing and pulsable confining thermal insulating enclosures enclosing said dialyzing layers, said blood being returned to the vein, and means to measure and control regulatory conditions of open and restricted blood flow adjusted to provide a sustained, normal physiologically viable cardiac output.

2. Apparatus as in claim 1 wherein said dialyzing solution flow is under a pulsatile action imposing up to 700 mililmeter mercury gauge vacuum, and said regulatory conditions range from open to restricted to closed flow adjusted to provide a sustained, normal and prelimited condition of blood pressure and blood flow.

References Cited

UNITED STATES PATENTS

| | | | |
|---|---|---|---|
| 2,659,368 | 11/1953 | Gibbon et al. | 23—258.5 |
| 2,927,582 | 3/1960 | Berkman et al. | 128—214 |
| 3,017,885 | 1/1962 | Robicsek | 128—214 |
| 3,043,303 | 7/1962 | Still | 128—214 |
| 3,206,768 | 9/1965 | Preston | 128—214 X |
| 3,212,642 | 10/1965 | Kylstra | 210—321 |
| 2,927,582 | 3/1960 | Berkman et al. | 23—258.5 |
| 3,332,746 | 7/1967 | Claff et al. | 210—321 X |

OTHER REFERENCES

Burney et al., Surgery, "Development of an Artificial Intrathoracic Heart," vol. 56, October 1964, pp. 719–725.

Claff et al., Proceedings of the 16th Annual Conference on Engineering in Medicine and Biology, "A Pulsatile Presusre Transport System Across Artificial Membranes," vol. 5, held Nov. 18–20, p. 114 and 115.

Cordell et al., Annals of Surgery, "Electromagnetic Blood Flow Measurement in Extracorporeal Circuits," vol. 151, January 1960, pp. 71–74.

Jochim et al., IEEE Transactions on Bio-Medical Engineering, "A Servo-Controlled, Whole Body, Blood Perfusion System as a Pressure/Flow Clamp," vol. 11, July 1964, pp. 94–102.

Kolff (an outline), from the Transactions of the American Society of Artificial Internal Organs, 6–1963, pp. 368, 376, 380, and 381 relied on. Copies may be ordered from Dr. George E. Schreiner, Depatrment of Medicine, Georgetown University Hospital, Washington, D.C.

Vadot et al., "Simplification of Extra-Corporeal Circulation by a Combined Pump-Heat Exchanger-Dialyzer Arrangement," from Trans. of the Amer. Soc. of Art. Int. Organs, 6–1964, p. 125 relied on.

REUBEN FRIEDMAN, *Primary Examiner.*

F. SPEAR, *Assistant Examiner.*

U.S. Cl. X.R.

210—90, 103, 143, 321, 541